United States Patent [19]
Millington

[11] Patent Number: 5,348,328
[45] Date of Patent: Sep. 20, 1994

[54] SULKY WHEEL GUARD

[76] Inventor: Howard G. Millington, 20 Perry Rd., Cable, Ohio 43009

[21] Appl. No.: 116,698

[22] Filed: Sep. 7, 1993

[51] Int. Cl.$^5$ .............................................. B62C 1/02
[52] U.S. Cl. ..................................... 280/63; 280/160
[58] Field of Search ................ 280/63, 152.1, 152.2, 280/156, 157, 152, 154, 160, 160.1

[56] References Cited
U.S. PATENT DOCUMENTS

| | | | |
|---|---|---|---|
| 384,335 | 6/1888 | Rogers et al. | 280/157 |
| 3,103,369 | 9/1963 | Gaines et al. | 280/63 |
| 5,174,594 | 12/1992 | Marshall et al. | 280/63 |

FOREIGN PATENT DOCUMENTS

| | | | |
|---|---|---|---|
| 21514 | 9/1916 | Denmark | 280/152.1 |
| 891207 | 9/1953 | Fed. Rep. of Germany | 280/852 |
| 44983 | 1/1939 | Netherlands | 280/852 |
| 190524 | 12/1922 | United Kingdom | 280/152.1 |

*Primary Examiner*—Kenneth R. Rice
*Assistant Examiner*—Michael Mar
*Attorney, Agent, or Firm*—Thomas S. Baker, Jr.

[57] ABSTRACT

A race sulky is provided with wheel guards that are each comprised of a pair of spaced-apart and opposed side shield surfaces, a nose shield surface that extends forward of the sulky wheel and joins the side shield surfaces into a U-shaped plan configuration, and fastener components that secure the joined side shield surfaces to the sulky wheel axle and sulky wheel fork.

3 Claims, 2 Drawing Sheets

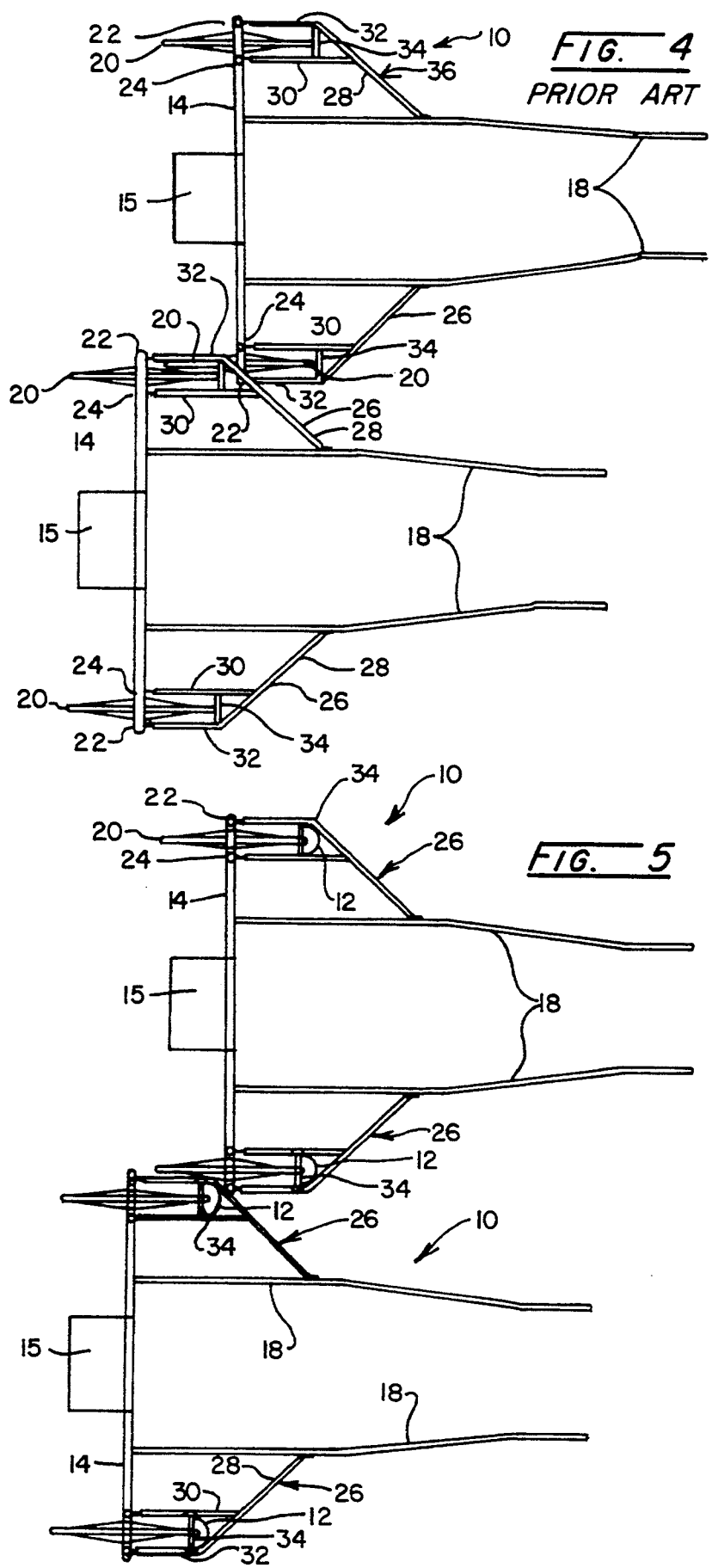

SULKY WHEEL GUARD

FIELD OF THE INVENTION

This invention relates generally to harness racing sulkies, and particularly concerns a sulky wheel guard which functions prevent certain types of harness racing accidents that otherwise could occur during the overtaking or passing of one racing sulky by another racing sulky.

BACKGROUND OF THE INVENTION

During the course of a harness horse race it is possible one or more of several different types of undesirable sulky-to-sulky wheel engagements to occur. For instance, frequently an overtaking sulky traps a wheel of the overtaken sulky between a wheel and its inner fork half of the overtaking sulky. Also, is common for the overtaking sulky to trap a wheel of the overtaken sulky between a wheel and its outer fork half of the overtaking sulky. Such sulky-to-sulky wheel engagements often referred to as "hooking," "locking wheels," or "locking up." Regardless of the name, such events are highly dangerous and can result in serious accidents causing injury or damage to drivers, horses, or equipment.

During the course of a harness race it is also possible for an outer fork half of an overtaking sulky to ride up onto a wheel of the sulky it is overtaking. When such occurs, the side of the overtaking sulky making fork-to-wheel contact with the overtaken sulky is often rapidly elevated and the consequent tipping of the sulky may cause the driver to be pitched to the ground and severely injured.

A simple U-shaped tubular guard has been proposed for incorporation on racing sulkies to prevent "hooking" or "locking up" from occurring during sulky-to-sulky wheel engagements, but such a solution to the problem is deficient in at least two respects. The U-shaped tubular guard constitutes structure in which a hoof of the horse drawing the sulky can become entangled and thus lead to tripping and a sulky pile-up. Also, the U-shaped tubular guard member does nothing to prevent the incorporating sulky's outer fork half from being able to ride up and onto the wheel of a sulky which it is overtaking.

My invention, when properly combined with the structure of a conventional harness racing sulky, functions to eliminate the sulky capability for trapping a wheel of a sulky being overtaken, and also to eliminate the possibility of any portion of the sulky's fork from riding up and onto the wheel of a sulky being overtaken.

SUMMARY OF THE INVENTION

To eliminate the possibility of the previously-discussed sulky-to-sulky wheel engagements from occurring during the course of a harness race, I provide each wheel of a racing sulky with a novel wheel guard. The novel wheel guard is preferably manufactured of a material having high impact strength such as sheet polycarbonate, sheet metal, or sheet fibre-reinforced plastic and is formed to have a U-shaped configuration when viewed from above that extends over each side and forward of the wheel. When viewed in side elevation, the formed wheel guard extends vertically from the sulky fork downwardly to within a few inches of the ground. The formed wheel guard extends horizontally from forward of the sulky wheel aftwards to the wheel hub. Appropriate flanges, brackets, and fastening devices are provided for supporting and attaching the wheel guards on and to the sulky.

DESCRIPTION OF THE DRAWINGS

FIG. 4 illustrates one form of "wheel locking" which may occur as between harness racing sulkies not having wheel guards; and FIG. 5 illustrates the manner in which "wheel locking" is prevented by utilization of the wheel guard of my invention.

DETAILED DESCRIPTION

Figure 1:
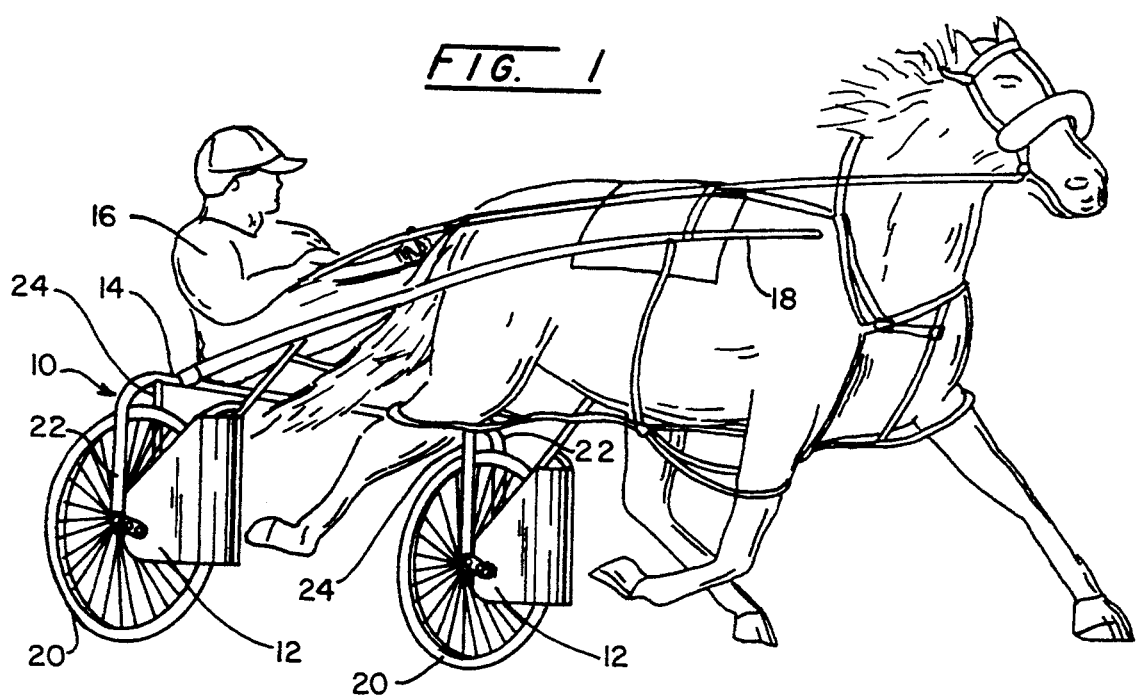
FIG. 1 is a somewhat perspective view of a harness racing sulky having preferred embodiments of the sulky wheel guard of this invention incorporated thereon.

FIG. 1 illustrates a typical harness racing sulky (10) equipped with the wheel guards (12) of this invention. Sulky (10) is constructed in a conventional manner and is basically comprised of an inverted, U-shaped tubular axle arch (14) having an attached seat (15) upon which the driver (16) is supported (see FIGS. 4 and 5), a pair of tubular shafts (18) (also see FIGS. 4 and 5) normally attached to axle arch (14) by welding, and a pair of spoked wheels (20) which are mounted for rotation at each extreme of axle arch (14). The outer hub of each wheel (20) engages an extreme end of the outer hub strut component (22) of the axle arch; the inner hub of each wheel (20) engages an extreme end of an inner hub strut component (24) which normally is joined to axle arch (14) by welding.

Also comprising a part of sulky (10) are the fork assemblies designated (26) that are each joined at one extreme to a respective shaft (18) and at the other extreme to its respective paired outer and inner hub strut components (22 and 24). Typical sulky fork assemblies may have any one of several known configurations. The fork assemblies (26) illustrated in FIGS. 4 and 5, for instance, are each comprised of a fork stem (28) joined at one extreme to its respective shaft (18) and at its other extreme to inner and outer fork legs (30 and 32). The lowermost extremes fork legs (30 and 32) are in turn joined to the lowermost extremes of outer and inner wheel hub strut components (22 and 24) as by welding. A cross brace (34) is welded between inner and outer fork legs (30 and 32). Fork assemblies (26) primarily function to provide additional rigidity to the sulky axle arch (14) and shaft (18) combination.

Figure 2:
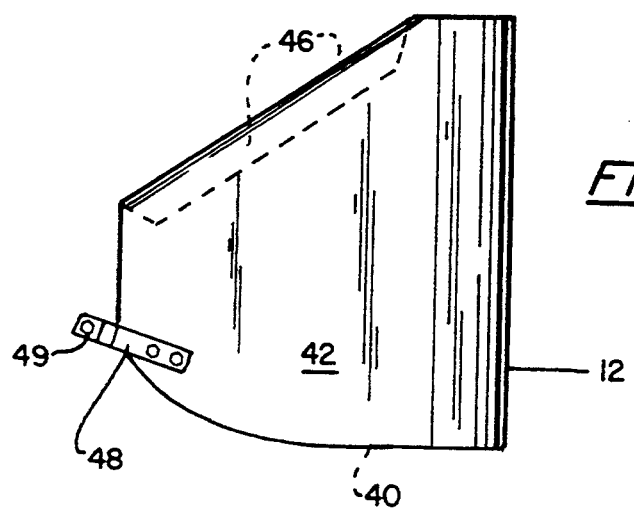
FIG. 2 is a side elevational view of one of the sulky wheel guards illustrated in FIG. 1.
Figure 3:
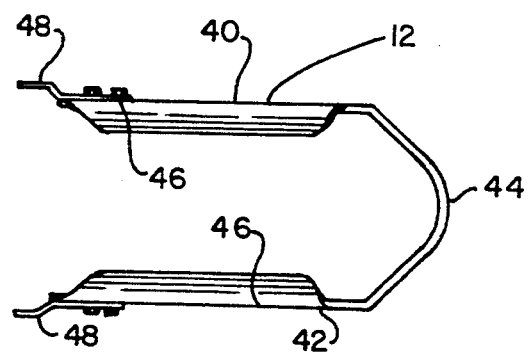
FIG. 3 is a plan view of the sulky wheel guard illustrated in FIG. 2.

FIGS. 2 and 3 best illustrate the wheel guard (12) of my invention in greater detail. As shown in plan in FIG. 3, wheel guard assembly (12) has a pair of opposed side shield portions (40 and 42) joined by integral nose shield portion (44). The upper margin of each of side shield portions (40 and 42) is provided with a compound flange (46) which cooperates to partially surround and cause the shield portion to be supported by a respective one of fork legs (30 and 32) when assembly (12) is mounted at each wheel (20) of sulky (10). The lower margin of each side shield (40), (42) is located to terminate a short distance above the ground when the wheel guard assembly is secured properly to the sulky. Alternatively, compound flange (46) might be replaced with bracket attachments which are to be clamped to fork legs (30), (32) by conventional clamping devices.

In addition, each of side shield portions (40 and 42) of assembly (12) is provided with an attached bracket (48) having a hole (49) in one extreme for receiving or mating with the axle of wheel (20). Thus, a properly installed wheel guard (12) is secured to sulky (10) by both axle bolt brackets (48) and fork flanges (46) or their functional equivalents.

FIG. 4 is provided to illustrate the "hooking" problem as it can occur suddenly and unintentionally during a race involving race sulkies not equipped with an appropriate wheel guard. As shown in that Figure, the lowermost of sulkies (10), which is the overtaking sulky, has caused the right wheel of the uppermost, or overtaken, sulky to become wedged between the left wheel of the overtaking sulky and its adjacent fork outer leg. The illustrated condition, which may lead to a sulky-to-sulky wheel-engagement accident, can be alleviated only by either the overtaking sulky slowing down relative to the overtaken sulky or by the overtaken sulky speeding up relative to the overtaking sulky. Most often the drivers of the so-engaged sulkies are not sufficiently aware of the engagement condition to make an accident-avoiding maneuver.

FIG. 5, on the other hand, illustrates a like race situation but involving sulkies (10) that are equipped with wheel guards (12) in accordance with this invention. As will be noted from a study of FIG. 5, the lowermost overtaking sulky (10) because of the presence of a wheel guard (12) on its left wheel is prevented from trapping the unprotected rear portion of the right wheel of the overtaken sulky (10) between its wheel and outer fork leg components. Also, the presence of wheel guard (12) on the overtaking sulky's left wheel (20) prevents both fork legs (30 and 32) of the sulky from riding up and onto the right wheel of the overtaken sulky thus preventing a type of race accident that differs from the "locking-up" type of race problem.

Other materials, component shapes, and component sizes may be utilized in the practice of this invention.

Since certain changes may be made in the above-described system and apparatus not departing from the scope of the invention herein and above, it is intended that all matter contained in the description or shown in the accompanying drawings shall be interpreted as illustrative and not in a limiting sense.

I claim my invention as follows:

1. A sulky wheel guard assembly in combination with a race sulky having an axle arch, a pair of shaft attached to said axle arch, a wheel rotatably mounted on a wheel axle, attaching means for attaching said wheel axle to said axle arch, a wheel fork having a pair of spaced inclined arms attached to said wheel axle and to one of said shafts which overlies the front of said wheel, and comprising:

a pair of spaced-apart and opposed side shield surfaces;

a nose shield surface joining said pair of side shield surfaces into a U-shaped plan configuration and situated forwardly of the sulky wheel and overlying said wheel fork; and securing means securing said joined side shield and nose shield surfaces to the wheel axle and to the wheel fork such that said nose and side shield surfaces overlie said wheel fork and the front portion of said wheel, wherein said means securing said joined side shield and nose shield surfaces to the wheel fork includes a compound flange at an upper margin of each one of said pair of side shield surfaces for engaging respective ones of the pair of spaced inclined arms of the wheel fork such that the fork lies between said pair of side shield surfaces.

2. The sulky wheel guard assembly and race sulky combination defined by claim 1 wherein said means securing said joined side shield and nose shield surfaces to the wheel axle include hole means engaging the wheel axle and said wheel lies between said pair of side shield surfaces and rearwardly of said nose shield surface.

3. The wheel guard assembly and race sulky combination defined by claim 1 wherein said side shield and nose shield surfaces are post-formed of sheet-formed polycarbonate resin.

* * * * *